INVENTORS.
SEYMOUR GROSS
WILLIAM A. DOWNES
FRANK B. RAKOFF

Sept. 30, 1969 S. GROSS ET AL 3,469,821
DEPTH CONTROL SYSTEM FOR TOWED BODY
Filed March 20, 1967 7 Sheets-Sheet
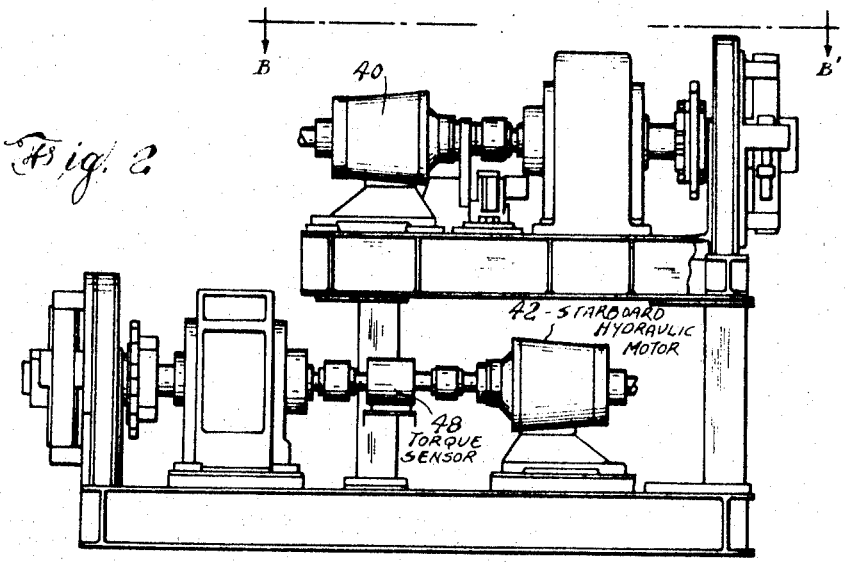
Fig. 2
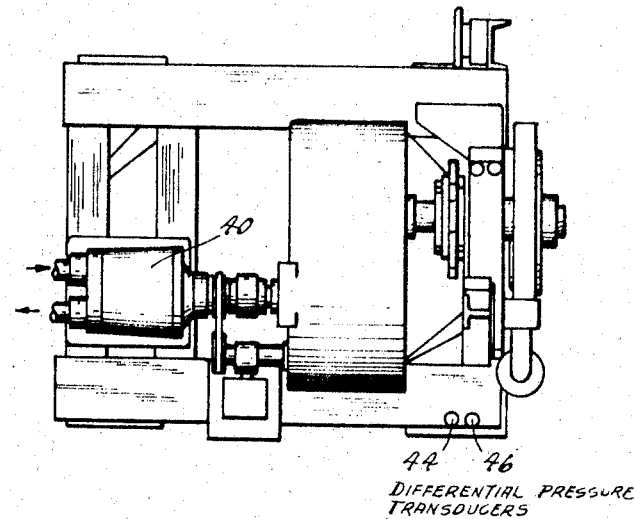
Fig. 3
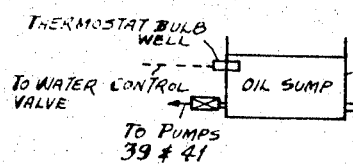
Fig. 4b
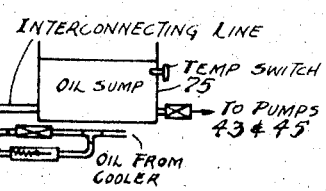
INVENTORS.
SEYMOUR GROSS
WILLIAM A. DOWNES
FRANK B. RAKOFF
BY Philip Schneider
Louis B. Appleton
ATTORNEYS

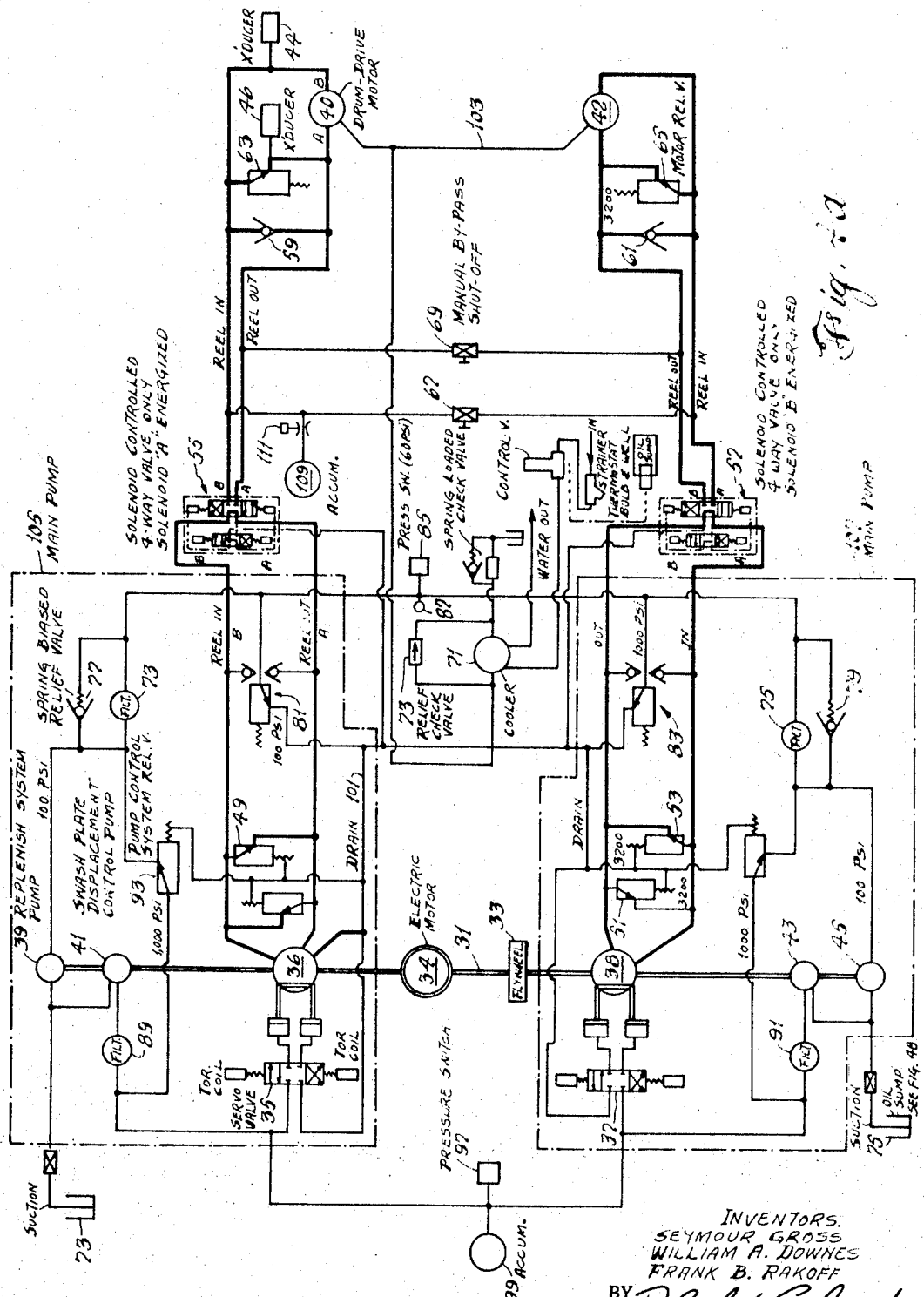

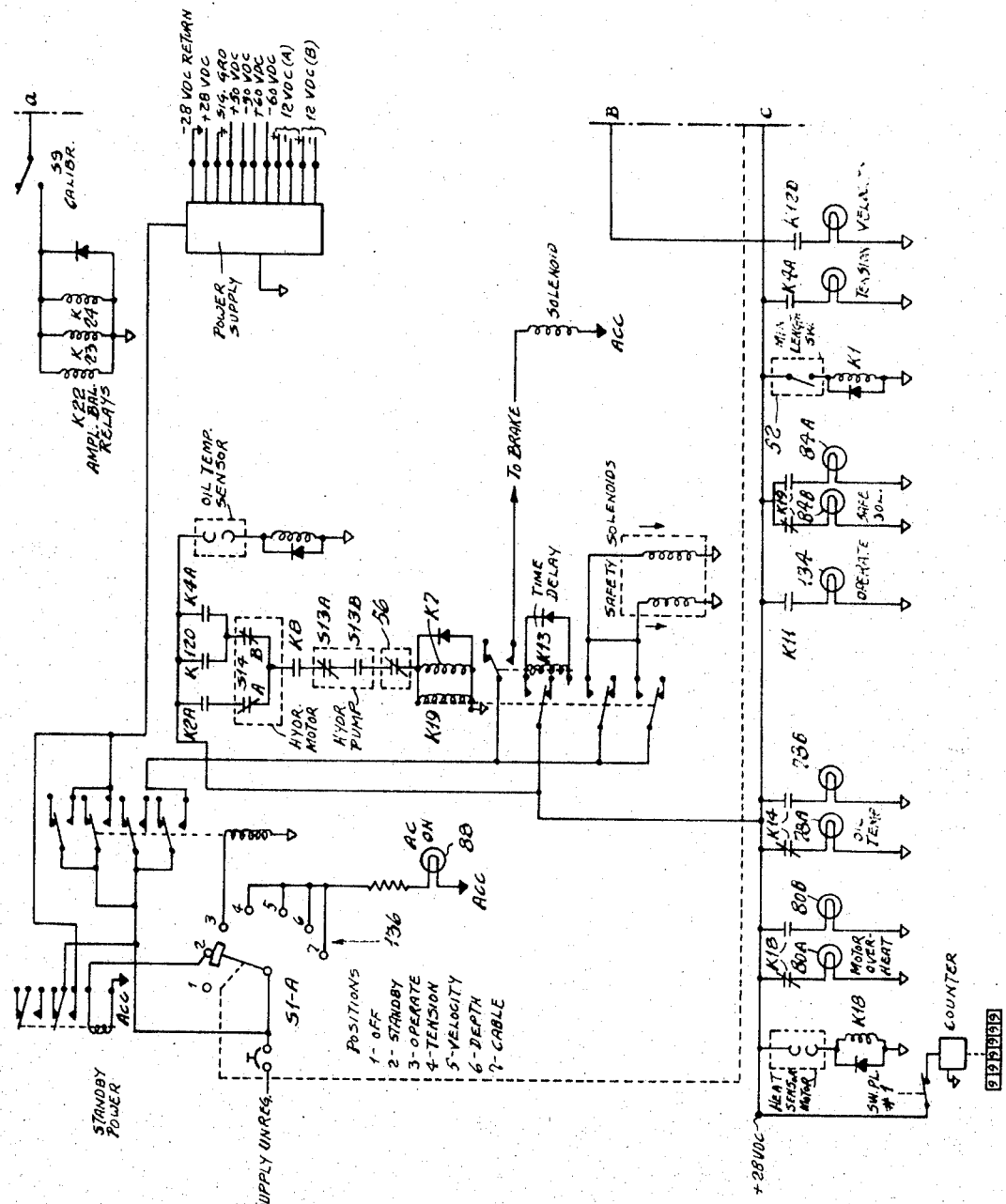

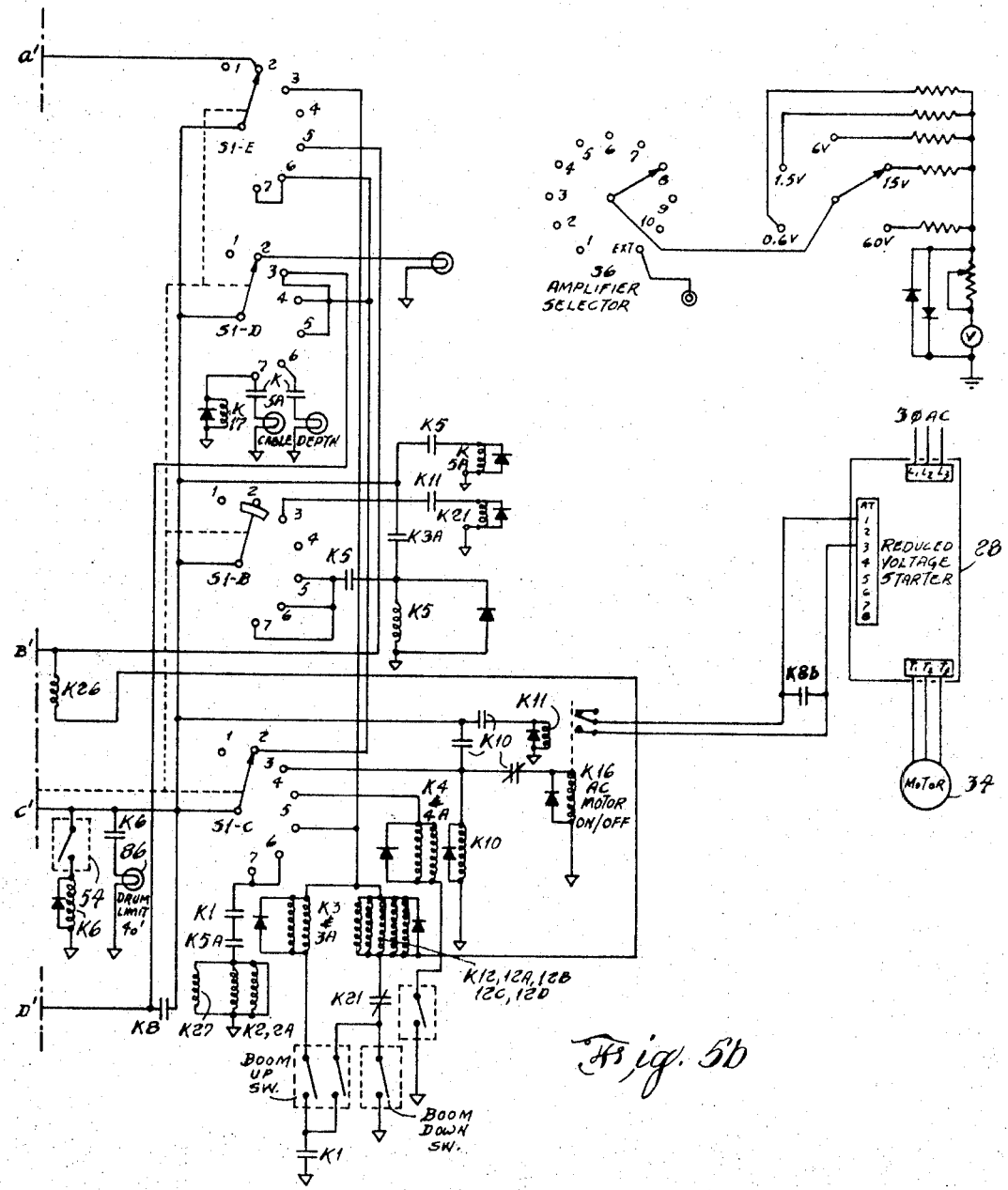

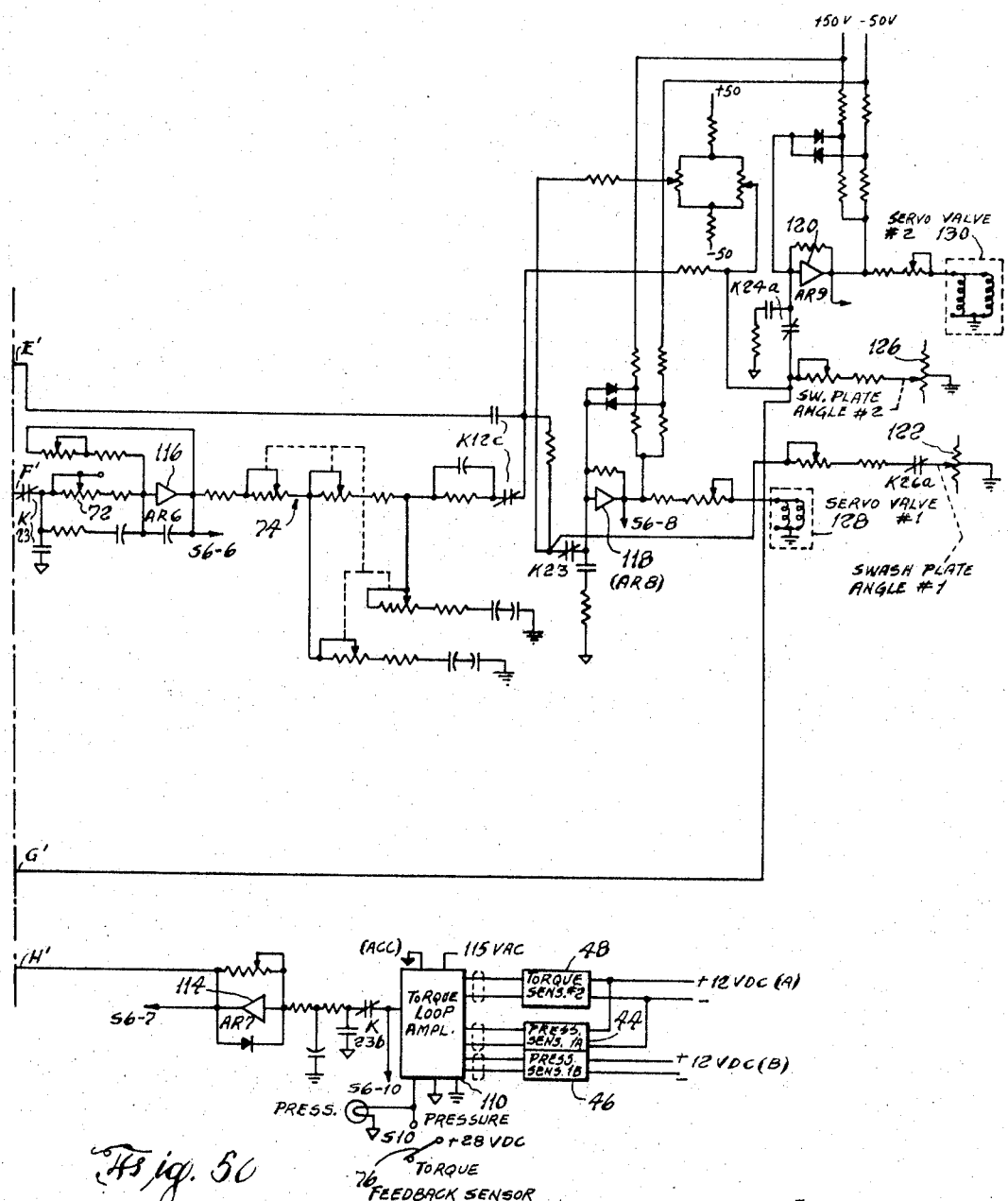

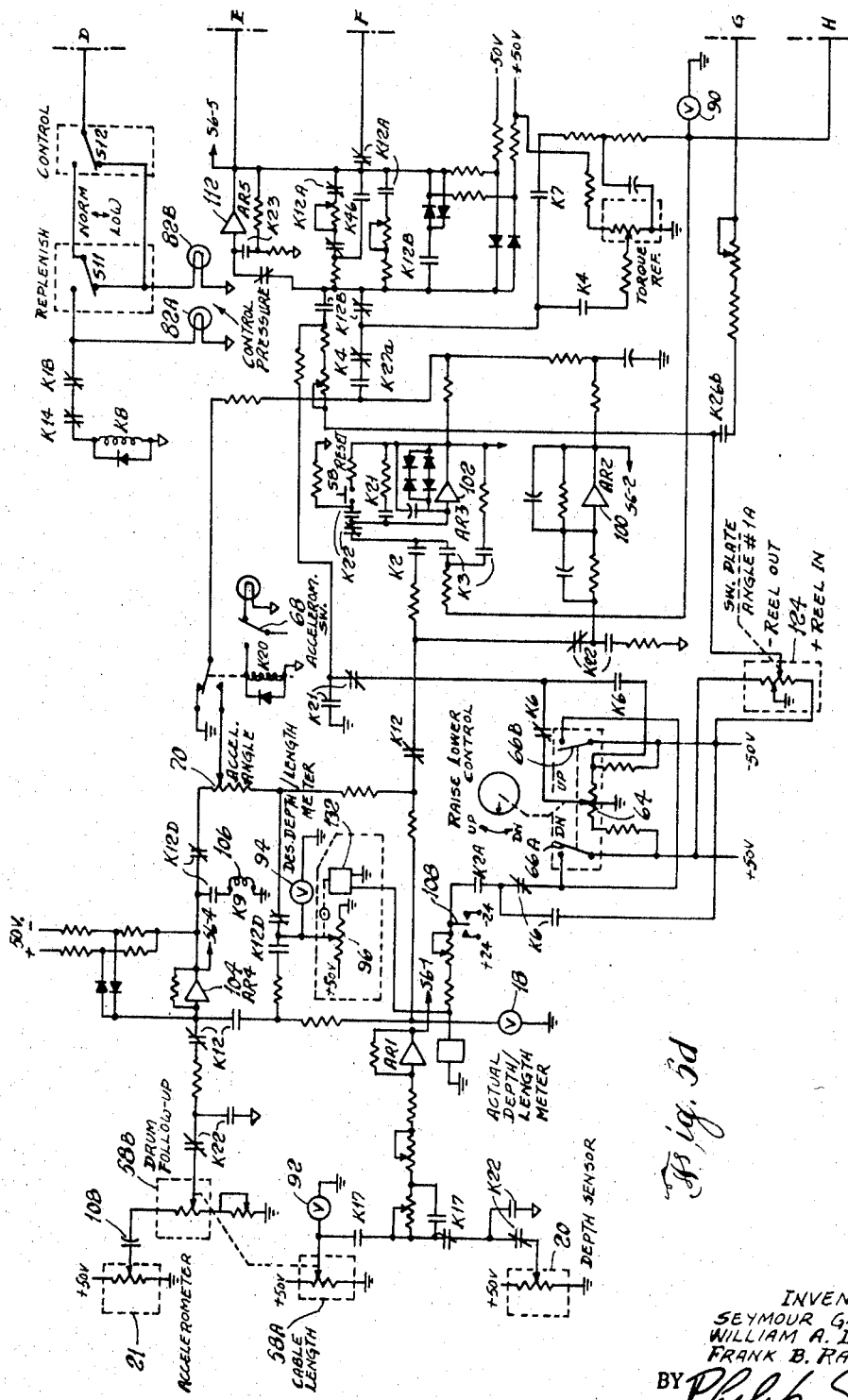

United States Patent Office 3,469,821
Patented Sept. 30, 1969

3,469,821
DEPTH CONTROL SYSTEM FOR TOWED BODY
Seymour Gross, New London, William A. Downes, Mystic, and Frank B. Rakoff, New London, Conn., assignors to the United States of America as represented by the Secretary of the Navy
Filed Mar. 20, 1967, Ser. No. 624,617
Int. Cl. B66d 1/48; B63d 35/02
U.S. Cl. 254—173                                   12 Claims

ABSTRACT OF THE DISCLOSURE

An automatic depth control system for a submerged towed body having an electrohydraulic drive system for driving the towline drum, a set of sensors (accelerometer, depth, torque and hydraulic-pressure) for obtaining electrical signals proportional to deviations in depth of the towed body and tension variations in the towline, and electronic means for using the sensor signals to control the operation of the towline drum so as to keep the towed body at a constant depth.

The invention described herein may be manufactured and used by or for the Government of the United States of America for governmental purposes without the payment of any royalties thereon or therefor.

BACKGROUND OF THE INVENTION

This invention relates to depth control systems and especially to apparatus for controlling the depth of an object, such as a sonar transducer array, which is to be towed at a fixed depth behind a moving vessel.

When an object must be towed at a fixed depth behind a moving vessel, difficulties arise in keeping the object at a predetermined depth because of the movements of the towing vessel in response to movements of the water at the surface of the sea. These movements of the towing vessel comprise vertical variations and accelerations. Previous devices and systems have not been effective in maintaining towed bodies at a selectable fixed depth in rough sea conditions within the relatively narrow limits which are desired in sonar applications, for example.

SUMMARY OF THE INVENTION

Means are provided to sense changes in depth of the towed object and changes of tension in the towline due to motions of the towing vessel caused by rough seas. Deviational signals proportional to depth and tension changes are fed back through an electronic system to automatically control the operation of the towline drum whereby the depth of the towed object is maintained at a constant level.

An object of this invention is to automatically maintain a submerged towed body at a selectable fixed depth in spite of ship movements in rough sea states.

Another object is to automatically maintain the proper tension and minimize slackness in the towline cable connecting a towing vessel with a submerged towed body.

Other objects and advantages will appear from the following description of an example of the invention, and the novel features will be particularly pointed out in the appended claims.

In the accompanying drawings:

FIG. 2 is a view of the hydraulic pumps taken along section line A-A' in FIG. 1A and showing the location of the torque sensor mounted on the shaft of the lower, or starboard, hydraulic motor;

FIG. 3 is a view of the upper (port) motor taken along section line C-C' in FIG. 2 and showing the location of the hydraulic differential pressure sensors which are mounted in each of the supply line ports to the motor;

FIG. 4A is a schematic diagram of the hydraulic system;

FIG. 4B is a schematic diagram showing the oil sump system in greater detail; and FIG. 5A–5D are schematic circuit diagrams of the electrical system of the invention.

DESCRIPTION

Figure 1A:
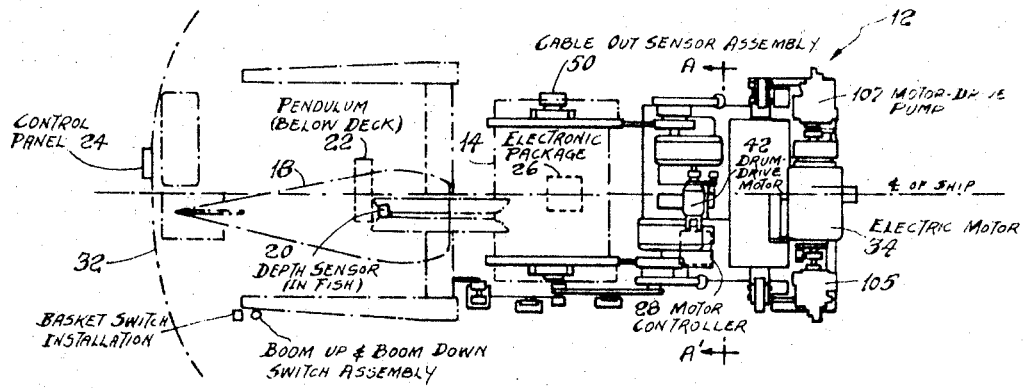
FIG. 1A is a top view of the components of the preferred embodiment of the invention as they are situated at the stern of the main deck.
Figure 1B:
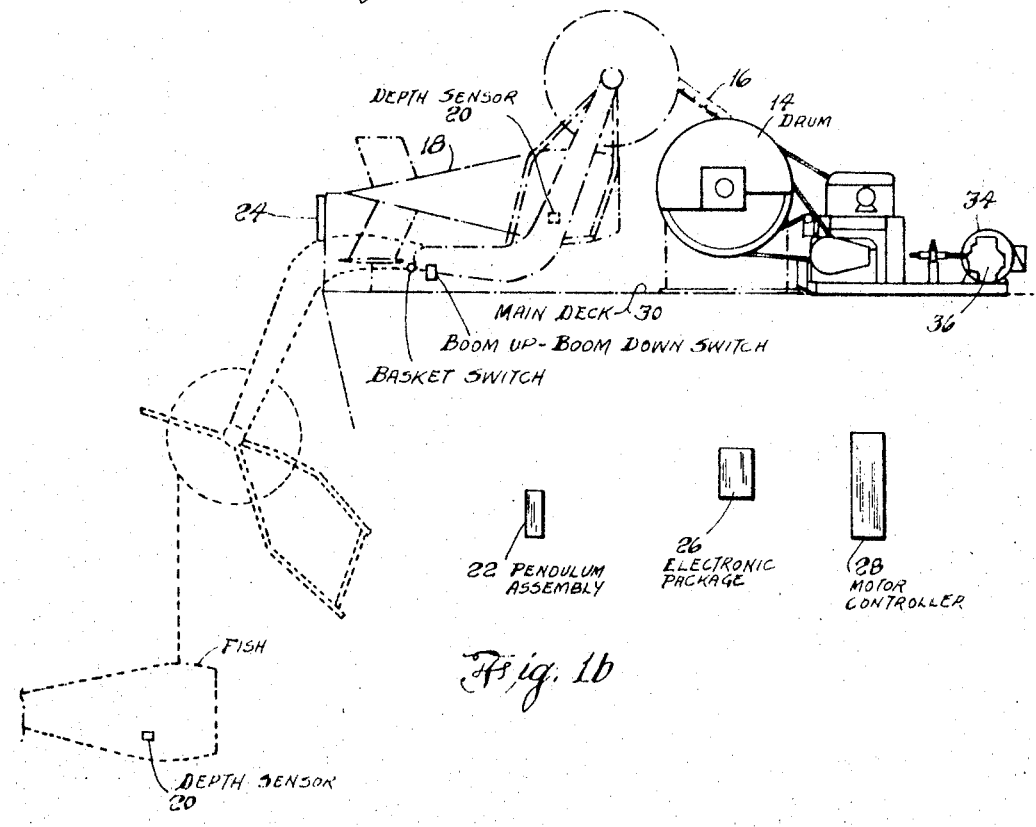
FIG. 1B is a side view of the components of the preferred embodiment, looking inboard to port.

The system is described relative to an existing submerged body towing system but is useful with other towing systems having a towline drum, towline and hoist system.

*General.*—The control system equipment together with the components of the existing U.S. Navy AN/SQA–10 hoist system constitute a variable depth sonar (VDS), automatic, fish-depth-control system. In addition to using an existing AN/SQA–10 fish (i.e., submerged towed body), towline, drum and hoist system, the experimental control system includes the following equipment:

(a) Electrohydraulic power drive system 12 for driving the AN/SQA–10 drum 14, towline 16, and fish 18.

(b) Sensors including a new depth sensor 20, an accelerometer (located in the pendulum package 22), a torque sensor and hydraulic pressure sensors.

(c) A control panel 24 for selecting and sequencing the operation of the system.

(d) An electronic package 26 containing the amplifiers, power supply and controller circuitry.

(e) A low voltage auto-transformer motor controller 28.

The combined experimental VDS depth control system will maintain the VDS fish at essentially constant depth in rough sea conditions, thereby reducing fish pitch perturbations and tow cable tension variations caused by ship motions. The pendulum assembly 22, the electronic package 26 and the motor controller 28 are mounted below the main deck 30; the rest of the equipment is mounted above the main deck 30 at the stern 32 of the vessel.

*Electrohydraulic power drive system.*—A nominal 75 HP electric drive motor 34 is the main power source for the power drive system. Power transmission between the electric motor and the hoist drum is effected by a closed circuit hydraulic transmission driving a system of roller chains. A flywheel is located at the output shaft of the electric motor for the purpose of maintaining a constant energy level in the drive system. The drive system is is mounted on a single structural frame assembly (not shown) in which the total weight is approximately 12,000 pounds with a space requirement of approximately 12 feet x 12 feet x 6 feet high.

*Closed circuit hydraulic transmission system.*—The hydraulic transmission system consists of two variable-delivery, servo-actuated piston pumps called the motor-drive pumps 36 and 38 driving two fixed displacement motors 40 and 42. The hydraulic drum-drive motors 40 and 42 each drive a 6.2:1 gear-type speed reducer, each of which has 22 tooth sprockets of 2-inch pitch at its output shaft. The two variable-delivery pumps 36 and 38 are driven by the electric drive motor 34, through the common shaft 31 of the motor. One side of the double-ended shaft supports the flywheel 33 and drives one of the hydraulic drum-drive pumps. Pump displacement is controlled by an electrohydraulic servo valve (35 and 37) mounted directly to each pump's servo-valve manifold. Control flow necessary for the servo valve and replenishment flow for replacing the leakage fluid is provided by separate pumps (39, 41, 43 and 45) mounted within the main pump housing.

*Main drive system pressure.*—The maximum continuous operating pressure for the system is 2500 p.s.i. The pump crossline relief valves 47, 49, 51 and 53 are set at 3200 p.s.i. The main system pressure is determined by the torque demand of the cable drive and is therefore not a constant pressure system.

*Control system pressure.*—The control system pressure relief valves are set at 1000 p.s.i. each.

*Replenish system pressure.*—The replenishing pressure relief valves are set at 100 p.s.i. each.

*Safety solenoid valve.*—The drive system includes two four-way, 3-position solenoid valves 55 and 57 installed in the connecting lines between the pumps and the hydraulic motors. Each valve is pilot-operated hydraulically and is spring-centered to neutral. Only one solenoid is used with each valve and directs the main stage of the valve from neutral to its energized position. In the de-energized position (neutral), the pump supply ports are connected to each other and the control ports to the hydraulic motor are blocked. In the energized position, the valve connects the pump supply ports to the control ports of the hydraulic motor. The valve operates on 115 v., 60-cycle, electrical power with an inrush circuit of 10 amps and a holding current of 1.1 amps. All valve connections are welded flange type with O ring seals, the high pressure reel-in ports are 1½" and the low pressure reel-out ports are 2" size. The valves are mounted on steel platforms on each side of the drive system between the hydraulic pumps and motors.

*Drive system check valve.*—The drive system includes two crossline check valves 59 and 61, one installed across each hydraulic motor to allow fluid to bypass the motor if the reel-out pressure exceeds the reel-in pressure. The valve serves as a safety to prevent pressurized reel-out of the hoist drum. All valve connections are welded flange type with O ring seals.

*Drive system relief valve.*—The drive system includes two crossline relief valves 63 and 65, one installed across each hydraulic motor to regulate the maximum reel-in pressure to a value of 3200 p.s.i. when the safety solenoid valve is deenergized. The relief valve has an adjustable pressure range of 2500 p.s.i. to 5000 p.s.i. The valve connections are welded flange type with O ring seals. The high pressure reel-in port is 1½" size and the low pressure reel-out port is 2" size.

*Fluid medium.*—The fluid in the system is a petroleum base hydraulic oil designated 2135TH and manufactured to the specification MIL-L-17672B.

*Main hydraulic system piping.*—The main hydraulic system piping is 1½" size for the reel-in lines and 2" size for the reel-out lines. The reel-in and reel-out lines within the piping system are interconnected on the motor side of the safety solenoid valves 55 and 57 by 1" size pipes with shutoff valves 67 and 69 for opening and closing the cross connection.

*Cross-over shutoff valves.*—Two globe-type, manually operated shutoff valves 67 and 69 are in the crossover lines. One in the reel-in line and one in the reel-out line ports on the valve are 1" socket-welded connections. The pressure rating of the valve is 5000 p.s.i. maximum operating pressure.

*Oil cooler.*—An oil cooler 71 is provided in the case drain and return system. The cooler is installed in a common return line to the hydraulic sump. Fresh water is used as the coolant at a maximum flow of 25 gallons per minute. A relief check valve is provided in a bypass line around the oil side of the cooler to allow bypassing in case of blockage of the oil flow in the cooler. Connections for the oil lines are 1½" pipe thread ports.

*Sump.*—The existing AN/SQA-10 hoist pedestal sump installation is utilized for the VDS control system. Two additional suction ports (1¼" pipe size) are provided, one in each pedestal, and a system return connection (1¼" pipe size) which is in the common crossover line between the pedestals. These connections include manual shut off valves.

*Auxiliary hydraulic system.*—The auxiliary hydraulic system consists of the replenish system, the pump swash-plate control sytsem, and the case drain system. Basically it conists of all the equipment necessary to keep the main drive system operational. The auxiliary system piping is tubing utilizing flareless connections (e.g., Ferulok fittings—Parker).

*Replenish system.*—The replenish system provides the make-up (replenish) oil to the main drive lines resulting from leakage in the main drive components of the hydraulic transmission. The basic system consists of two positive displacement pumps 39 and 45, 10 micron filters 73 and 75, 100 p.s.i. relief valves 77 and 79, replenish check valves 81 and 83, and the necessary interconnecting piping between the replenish ports of the main system pumps. The replenish pumps are driven by the main system pump and are housed in the main system pump. The relief valves 77 and 79 are an adjustable type and are located along with the filters and replenish check valves in the main system housing. Each pump has its individual replenish system which is interconnected by a common line carrying a pressure switch 85 and an accumulator 87.

A pressure switch 85 is provided in the replenish circuit to serve as a low-pressure warning at less than 60 p.s.i. The low-pressure warning results in a hydraulic shutdown. The pressure switch is mounted on the tube connecting the replenish ports of the main drive pumps 36 and 38.

The replenish system accumulator 87 is a ¼-gallon, bladder type oil accumulator and is connected to the replenish system adjacent to the pressure switch. The accumulator is mounted to the upper frame structure between the hydraulic pump and the drive assembly. The accumulator smooths out flow changes in the replenish interconnecting line. The accumulator precharge is 60 p.s.i.

*Pump control system.*—This system supplies hydraulic oil to control main pump swash-plate displacement as directed by the electronic control system. Each main drive pump has its individual control system which consists of a positive displacement pump 41, 10 micron filter 89, a 1000 p.s.i. relief valve 93, and an electrohydraulic servo valve 35. The control pressure auxiliary ports of the pumps are connected by a common line which ties in a pressure switch 97 and accumulator 99 into the control system circuit.

The pump displacement-control-system accumulator 99 is a 1-gallon, bladder type, which is connected to the cross-over line between the control pressure ports of the pumps. The accumulator 99 is precharged to 500 p.s.i. with dry nitrogen.

A servo valve 35 is mounted on each of the system's pumps by a manifold on the swash-plate displacement actuator. The flow capacity of the valve is 5 g.p.m. with a 1000 p.s.i. pressure differential across the valve. The valve has a built-in filter and contamination tolerance of 200 microns.

The pressure switch 97 is connected to the control pressure line to detect low pressure and to provide the necessary signal for low-pressure indications (below 650 p.s.i.) on the control panel.

*Case drain and return system.*—This system provides for the return of the case drain oil from the pumps and hydraulic motors which includes the oil flow from case leakage, replenish system, and control pressure system. The case drains of both the pumps and motors are connected to a common line which directs the return oil to the sump through the oil cooler. The case drain piping (e.g., 101 and 103) consists of 1" tubing from the pumps and ½″ tubing from the hydraulic motors. The common return line is 1¼″ tubing.

*Main pump.*—Each of the two main pumps 105 and 107 includes a motor-drive pump, e.g., 36, (an over-center, servo-controlled, variable-delivery, axial piston type), replenishing check valves and crossline relief valves in a common housing. In addition, each main pump 105 includes a control pressure pump 41 (or swash-plate displacement control pump) and replenish pump 39 with applicable relief valves for pressure adjustment and filters for contamination control. Motion of the motor-drive pump's (36) swash-plate for variable delivery control is accomplished by a self-contained double acting hydraulic cylinder.

*Pump configuration.*—The motor-drive pump parameters are the following:

(a) Full pump displacement ___ 23.45 in.$^3$/rev.
(b) Pressure range _____ 0–3000 p.s.i. (with 3500 p.s.i. maximum capability)
(c) Nominal operating speed __ 1750 r.p.m.
(d) Flow at 3000 p.s.i. and 1750 r.p.m. _____ 170 gal. per min.

These parameters are provided by the Denison Engineering Division, American Brake Shoe Corporation. Models P/NS M15–16502 and M15–16514, for example.

*Servo valve mounting provisions.*—A manifold (sub-plate) is provided between the swash-plate displacement actuator and the servo valve 35 which interconnects the valve's ports with those of the actuator and control pressure supply.

*Crossline relief valves.*—The integral crossline relief valves 47, 49, 51 and 53 are set at 3200 p.s.i. at full pump flow.

*Integral auxiliary pumps.*—Within the common housing of the main drive pump, two auxiliary pumps are provided, the control pressure 41 pump and the replenish pump 39.

*Control pressure pump.*—This pump 41 is a positive displacement vane-type directly coupled to the main pump's drive shaft and built integral with the housing of the pumps. Capacity is 4 g.p.m. at 1000 p.s.i. when run at normal speed. An adjustable relief valve 93 set at 1000 p.s.i. establishes the control pressure setting. This pump is also known as the swash-plate displacement control pump.

*Replenish pump.*—This pump 39 is a positive displacement vane type directly coupled to the motor-drive pump's drive shaft and built integral with it. Capacity is 24 g.p.m. at 100 p.s.i. when run at normal speed. An adjustable relief valve 81 set at 100 p.s.i. establishes the replenish pressure.

*Swash plate indication.*—Pump swash-plate indication is provided by potentiometers mounted on the swash-plate extension shaft. The star-board side pump 36 has two potentiometers 122 and 124 mounted on opposite sides of the swash-plate shaft. The port side pump 38 has one potentiometer 126 and a visual swash-plate indicator mounted on opposite sides of the swash-plate shaft.

*Hydraulic motors.*—The hydraulic drum-drive motors 40 and 42 are fixed displacement, axial piston type. Each motor is capable of operating under pressures up to 3500 p.s.i. Nominal system pressure is 2500 p.s.i. These parameters are provided by the Denison Engr. Division, American Brake Shoe Corporation, Models P/N$_s$ M15–00472 and M15–16516, for example.

*Displacement.*—The motor displacement is 23.45 in.$^3$/rev. (This displacement requires an overall motor-to-hoist speed reduction of 29:1).

*Direction of rotation.*—The motors are the reversing type.

*Operating speeds.*—The maximum capable operating speed of the motor is up to 1600 r.p.m. and a continuous capable speed of up to 250 r.p.m. for long term reel-in and reel-out operations.

*Leakage-accumulator device.*—A leakage accumulator device is provided to give stabilization against compressibility resonance. The device provides leakage-type damping at higher frequencies without the higher power losses resulting from adding simple crossline leakage. The leakage-accumulator device consists of a bladder-type accumulator 109 connected to the common high-pressure crossline between the hydraulic motors and pumps with a needle valve to control the flow into the accumulator.

*Accumulator.*—The leakage accumulator 109 is a one gallon capacity, bladder-type oil accumulator having a rated operating pressure of 3000 p.s.i. Precharge is adjusted to suit nominal loading condition at time of operation.

*Needle valve.*—A ¾-inch throttling needle valve 111 provides adjustment of the damping required by the variety of operating conditions.

*Flywheel.*—A steel flywheel 33 having a moment of inertia equal to 17.2 ft. lbs.-sec.$^2$ is mounted to the electric motor drive shaft. Nominal speed of the flywheel is considered as 1700 r.p.m. with speed variations of ± percent.

*Electric drive motor.*—An electric motor 34 drives the two hydraulic variable-delivery pumps 36 and 38.

*Electric motor characteristics*

Power rating _____ 75 HP.
Synchronous speed _____ 1800 r.p.m.
Voltage _____ 440 AC, 3 phase, 60 c.p.s.
Mounting _____ Horizontal.
Degree of enclosure _____ Totally enclosed, fan-cooled.
Frame size _____ 507U
Type of torque _____ Nema type D, 8 percent slip at rated HP.
Generator characteristics . Function as an induction generator.

*Electric motor starter.*—An electric motor starter 28, which is a reduced voltage, auto-transformer, AC, magnetic Controller, Class RV4, Nema size 4, is provided to control the startup characteristics of the electric motor.

OTHER MECHANICAL COMPONENTS

*Speed reduction system.*—The overall speed reduction between each hydraulic motor (40, 42) drive shaft and winch drum is 29.4:1. A gear-type speed reducer and a 2″ pitch roller chain and sprocket is utilized to transmit the driving torque from the motor to the drum. The first reduction from the hydraulic motor to the sprocket shaft is 6.2:1 ACMA gear ratio; the second reduction from the intermediate shaft to the drum is 4.75:1 (22 teeth on the pinion sprocket, 105 teeth on the drum sprockets). Each hydraulic motor (40, 42) drives through its own speed reduction system to the winch drum and each is independent of the other. The speed reduction systems are mounted on the bed plate on the upper and lower platform assemblies.

*Gear type speed reducers.*—Two gear type speed reducers, one for each hydraulic motor 40 and 42, provide the power to the main drive sprockets. The reducers have single stage reduction ACMA ratio 6.2:1.

*Sprocket drive.*—Power from the intermediate gear reducer is transmitted by 2″ pitch, ASA No. 160, single roller chain. Each intermediate shaft sprocket has 22 teeth and each drum sprocket has 104 teeth. Metal covers over the drive and drum sprockets provide personnel protection and protection of the chain against sea water splash. The drive sprocket is a split-hub-type having 22 teeth at 2″ pitch, ASA No. 160. A chain tightening sprocket provides takeup for the low tension side of the chain drive.

*Flexible couplings.*—Gear-type flexible couplings are used in the system to allow for slight misalignment of connecting equipment shafts.

*Torque sensor.*—An electromechanical torque sensor 48 is installed between the hydraulic motor and the speed reducer at the lower level drive system. The torque sensor is stabilized by a flexible metal strap and is connected by two flexible couplings to the adjoining shafts.

*Brake-pneumatic.*—A fail-safe brake (spring to close-air to release) is installed to each end of the power drive system at the main drive sprockets. The brake reaction frame is attached to the structural platform. The brake is spring loaded to its locking position. Pneumatic pressure (connected to the existing SQA-10 100 p.s.i. system) through a solenoid valve directs air pressure to the actuation cylinders of the brake causing the brake to release.

*Pneumatic brake valve.*—This is a solenoid-operated pneumatic valve which is electrically energized by the control system. The valve is a two position, three-way valve with direct solenoid operation.

*Idler sheave traversing system.*—A 1″ pitch, ASA 80 chain drive is provided for driving the traversing system gear motor sprocket from the main drive shaft. The traversing drive system is located on the starboard side of the AN/SQA-10 drum assembly. A double reduction is provided from the main system drive shaft to the traversing system gear motor using three chain stages. The first stage has a ratio of 1.18:1, the second stage has a unity 1:1 speed ratio, and the third stage is a 3:1 speed reduction. Between the chain drive sprockets are adjustable idling sprockets which allow takeup of the slack side of the chain.

*System sensors.*—The VDS control system contains several instrument-type sensors for the measurement of the following data:

(a) Depth
(b) Acceleration
(c) Hydraulic differential pressure
(d) Torque
(e) Cable length Pressure, temperature, speed and position switches are provided in the system for performing control logic functions.

*Depth sensor.*—A pressure-transducer-type of depth sensor 20 is located in the VDS fish on a mounting bracket attached to the existing transducer mounting platform. The depth sensor has a potentiometer pick-off and meets the following requirements:

Pressure range (mechanical) -- 0 to 300 p.s.i.g.
Pressure range (electrical) --- 14.7 to 237 p.s.i.a.
Maximum case pressure ------ 450 p.s.i.a.
Linearity ------------------- 1 percent or better.
Hysteresis ------------------ 0.25 percent or better.
Resolution ------------------ 0.25 percent or better.
Resistance ------------------ 10k±10%.
Power rating ---------------- 0.25 watt @ 50° C.
End points ------------------ 0% voltage @ 14.7 p.s.i.a.
                              97% voltage @ 237.2 p.s.i.a.
Material -------------------- Stainless steel.

*Accelerometer and pendulum mount.*—The accelerometer 21 for sensing the ship's vertical acceleration is part of the pendulum assembly 22 mounted on a pendulum platform and located below the deck in the VDS control room. Adjustment of the pendulum frequency is available by relocating the pendulum weight along the axis of its arm. The accelerometer is mounted with its sensitive axis in the vertical plane. Provision is made at the control panel for adjustment of the cable angle affect on the accelerometer signal being fed into the control system. The accelerometer employs a potentiometer pick-off and meets the following requirements:

Range ----------------------- +1–3 g.
Linearity ------------------- ±1 percent.
Resolution ------------------ 0.25 percent.
Potentiometer resistance ---- 3.33K.
Natural frequency ----------- 6.5 c.p.s.±10 percent.

*Pressure transducers (differential-pressure measurement).*—Two pressure transducers 44 and 46 are located at the upper platform hydraulic motor in each of the supply line ports of the motor. The transducers are identical in their output sensitivity and are set up to indicate the differential pressure across the hydraulic drive. These transducers meet the following requirements:

Pressure range -------------- 0–3000 p.s.i.g.
Maximum case pressure ------ 7500 p.s.i.g.
Linearity ------------------- 0.25 percent or better.
Resolution ------------------ Infinite.
Hysteresis ------------------ 0.35 percent or better.
Sensitivity ----------------- 3.0 mv./volt or greater.

*Torque sensor.*—The electromechanical torque sensor 48 is used to determine the amount of torque developed by the starboard hydraulic motor 42 and thereby indicate the total force developed in the tow cable. The sensor, a four-arm bonded strain gage, meets the following requirements:

Speed ----------- 1500 r.p.m.
Capacity -------- 15,000 (in lbs.).
Output ---------- 2 mv./volt.
Purge system ---- 7.5 c.f.m. of dry nitrogen, 0.3 p.s.i.g.

*Cable length sensor.*—The cable-out sensor 50 is a modification of the existing unit on the AN/SQA-10 hoist system. This device is directly coupled to and is driven by the cable drum 14. It contains three switches 52, 54, 56 and a two-gang potentiometer 58A and 58B.

*Drum position switches.*—The first 52 of the three cam-operated switches actuates when 40 feet of cable are reeled off the drum. It prevents operation in either the automatic cable or depth mode when the fish is too close to the stern of the ship. The second switch 54 actuates when 40 feet of cable are left on the drum. This imposes a reel-in signal on the control system independent of any other applied signal. If the cable continues to reel out the third switch 56 actuates when 25 feet of cable are left on the drum. This action interrupts the AC voltage supply stopping the electric motor, setting the mechanical brakes and closing the safety solenoids.

*Drum position potentiometers.*—The drum pots are used to indicate the length of cable reeled off the drum. The 1K ohm pot 58A gives a signal directly to the cable length meter on the control panel. The 20K ohm pot 58B is used in the accelerometer circuit and attenuates the signal as the cable is reeled out.

*Control panel.*—The control panel 14, located in the cab at the aft end of the ship, selects and sequences the operation of the system. The upper portion of the panel contains the indicators and warning lights and the lower portion of the selecting and sequencing controls.

*Mode selector switch.*—This seven-position switch 60(S1) is used for system start up, fish handling and depth and cable control mode selection. Its positions are: OFF, STANDBY, OPERATE, TENSION, VELOCITY, DEPTH AND CABLE.

*Raise/lower control.*—This control 62 is used in the fish handling and positioning modes of control and consists of a spring-centered potentiometer 64 and two single-pole switches 66A and B. One switch actuates when the wiper arm engages the resistance element and remains closed until it returns to mid-point. The outer switch operates in a likewise manner in the opposite direction. Mechanical stops are located 120° each side of center.

The maximum raise or lower rate available is 2 ft./sec. The rate of rise is proportional to the position of the raise/lower control knob between neutral and maximum "up" position. The same proportion is true for the "down" position when lowering the fish.

*Accelerometer channel.*—The accelerometer channel input may be selected "in" or "out" by means of the two-position accelerometer switch 68 on the control panel. When this channel is in effect, the operator sets in the cable tow angle on the accelerometer output dial on the panel by means of the accelerometer angle pot 70. The tow cable angle is the operator-estimated angle the cable makes with the horizon (horizontal plane). This angle will normally vary from 90 degrees (vertical tow cable) to approximately 40 degrees for high-speed tow.

*Gain controls.*—The compensation gain (R55) 72, and the feedforward gain (R58) 74 are screw driver, slot-set pots.

*Feedback selector.*—This two-position switch 76 allows the operator a choice of cable or force feedback into the system. The torque sensor 48, located between the hydraulic motor and the gear box, or the differential-pressure sensors 44 and 46, located at one of the hydraulic motors, may be selected. In the event of failure of either sensor, the remaining sensor will be utilized in the feedback circuit.

*Warning lights.*—A set of indicator lights, green for indicating normal functioning equipment and red for malfunctioning equipment, are included at the top of the panel. These lights 78A and B, 80A and B, 82A and B, and 84A and B, monitor the oil and motor temperature, the pump replenish and control pressure, and the safety solenoids. In addition there is a 40 foot drum limit light 86 which illuminates when only 40 feet of cable remain on the drum. If a loss of 110 v. AC power occurs the "AC ON" light 88 is extinguished.

*Panel meters.*—Four meters are included on the control panel to indicate the fish position and the cable condition.

*Cable force meter.*—This meter 90 is driven by the output of either the torque sensor or the differential-pressure sensors whichever is selected. The meter reads force directly and is calibrated in pounds.

*Cable length meter.*—This meter 92 is driven by the output of cable length potentiometer 58A in the cable-out sensor. The meter is calibrated in feet.

*Desired depth/length meter.*—This meter 94 is driven by a small servo-driven potentiometer 96. In the velocity mode of operation, the input signal to the servo motor 132 is the differential of the output of the depth sensor and the output of the desired depth/length pot. In the cable or depth mode, the servo and meter are driven by signals from the raise-lower control.

*Actual depth/length meter.*—This meter 98 is driven by the output of the depth sensor in the depth mode and therefore indicates actual depth. In the cable mode, it indicates cable length and duplicates the function of the cable-length meter. When switching from depth mode to cable mode at other than zero forward speed (vertical tow cable), a differential will exist between the desired-length meter and the cable-length meter. A reel-in signal will be generated until equalization is reached.

*Electronic package cabinet assembly.*—The electronic package cabinet assembly houses the system's electronic amplifier, DC power supply, and electronic circuits. A schematic diagram of the system's electric circuit is shown in FIG. 4.

*Circuit description.*—The electronic system consists of five control circuits connected to form a closed-loop depth and torque control system. These circuits are as follows:

(a) Fish position or depth control channel
(b) Acceleration feed-forward command channel
(c) Torque or pressure feedback channel
(d) Pump-swash-plate position control channel
(e) Raise-lower velocity control channel

*Fish position or depth control loop.*—The fish position or depth control channel utilizes either the depth pressure transducer or the cable-length sensor signals as feedback on the command signal from the desired-depth/length potentiometer 96. The depth/cable-length error signal is then applied to proportional plus integral sections of the position control loop (amplifiers (AR2) 100 and (AR3) 102. The desired-depth command signal is established at the time of positioning the fish to its operating depth (during the velocity mode) by a motor-positioned servo potentiometer 96. This pot is driven during the raise-lower operation by the actual depth/length sensor signal through a closed-loop path into amplifier (AR4) 104. A polarized relay 106 applies +50 v. DC or 50 v. DC through contacts 108 to the DC servo motor dependent upon the polarity of the signal at amplifier (AR4) 104.

The overall transfer function from fish depth or cable length to the torque control loop (for depth or cable control) respectively is $$\frac{3S+1}{\left(\frac{S}{5}+1\right)(S+1)} (125) \text{ lb. ft./ft.}$$

in the proportional channel and $$\left(\frac{1}{S}\right)(15.6) \frac{\text{lb. ft.}}{\text{ft./sec.}}$$

for the integral channel. Gains are expressed in terms of torque exerted on the cable drum.

The actual depth/length and desired depth/length meters 98 and 94 are provided in this channel.

*Acceleration feed-forward command channel.*—The accelerometer 21 mounted in its gimbaled pendulum package 22 provides the feed-forward command signal for driving the cable drum 14 in phase with the ship's motion in the sea. The accelerometer signal is applied to amplifier AR4 104 through an automatic-gain-adjustment resistor 58B which increases the accelerometer loop gain in proportion to the amount of cable on the drum. An operator-adjustable gain is provided by the accelerometer angle-adjust pot 70 (located on the face of the control panel) which adjusts the loop gain in accordance with the tow angle of the cable with respect to the horizon. This circuit is provided with a DC blocking capacitor 108 (low-pass filter) which eliminates the steady-state gravity acceleration and only passes low frequency oscillatory signals of the ship's pitching motion.

*Drum-torque feedback channel.*—Input to the torque feedback channel is from either the systems torque sensor 48 or the differential pressure transducers 44 and 46 dependent upon selection by the operator. These inputs enter the low-signal amplifier (AR10) 110 and are directed to the control system summing amplifier (AR5) 112 through the feedback channel gain adjustment amplifier (AR7) 114. This feedback channel is operative for the DEPTH and CABLE control modes only. A reference voltage is applied to this channel representing the required cable tension for operation in the TENSION control mode.

A cable force meter 90 is connected to the output of amplifier (AR7) 114 which reads the output in 0–25,000 pounds cable force.

During the raise-lower VELOCITY control mode the torque feedback signal is applied to amplifier 102 (AR–3) to build up an initial condition at the time of transition from the VELOCITY mode to the DEPTH or CABLE control modes.

*Pump swash-plate control channel.*—The pump swash-plate command signal generated at amplifier (AR5) 112 is directed through a series of compensation networks associated with amplifier (AR6) 116 and through said amplifier 116 itself into two parallel pump swash-plate control amplifier (AR8) 118 and (AR9) 120. Swash-plate angle or position feedback is provided in each of the pump command circuits. During the DEPTH and CABLE control modes the pump swash-plate angle signal nulls out the input signals into amplifiers (AR8) 118 and (AR9) 120 by direct feedback of the individual pump-position-potentiometer voltages into their respective control amplifiers.

Null or balance adjustments of the swash-plate angle control circuits are provided by a pair of adjustable potentiometers 122 and 126 for balancing each pump circuit with zero command voltage to this circuit.

Voltage-output limiting is provided at amplifiers (AR8) 118 and (AR9) 120 which limits the maximum current to the servo valve at 8 milliamperes.

*Raise-lower velocity control channel.*—Raising or lowering the fish in the water is accomplished in the VELOCITY mode of control. The raise-lower control dial (located on the control panel) commands an adjustable potentiometer voltage to the pump control amplifier (AR8 and AR9) 118 and 120 through the control amplifier (AR5) 112. A pump swash-plate angle potentiometer 124 nulls out this command signal at the proper pump output or the desired raise-lower velocity. The rate at which the fish is raised or lowered is controlled by the dial position to a maximum of approximately 2 feet per second.

During this mode the desired depth/length potentiometer 96 is driven by the actual depth or cable length signals as described in the previous paragraph entitled "Fish Position or Depth Control Loop."

*Amplifier description.*—Operational amplifiers are used in the system for the integral compensation channel, the proportional channel, the control signal summing stage, the control compensation stage and the servo valve amplifier stage, and operational amplifiers are used as isolation stages for the depth sensor potentiometer, the accelerometer potentiometer, and the torque sensor stage. All operational amplifiers are solid-state, printed-circuit-type amplifiers which are mounted on cards for easy insertion into the amplifier storage rack.

*Operational amplifier characteristics.*—The following operating characteristics are typical:

(a) Open loop characteristics:
   DC voltage gain _____ $3 \times 10^6$ ratio.
   DC input impedance _____ 500K ohms.
(b) Output characteristics:
   Maximum voltage _____ ±50 volts.
   Maximum current _____ ±50 milliamps
   Velocity limit _____ $10^6$ volts/sec.
(c) DC junction stability:
   Voltage offset _____ Adjustable
   Current offset _____ $10^{-4}$ microamps
   Drift voltage (−20° to +45° C.) _____ 15 μv/°C.
   Drift voltage (constant temperature) _____ 15 μv/8 hrs.
(d) Operating temperature _____ −55° C. to +55° C.
(e) Noise—referred to input peak to peak _____ 2 millivolts
(f) Frequency response (−3 db) _ $10^5$ c.p.s.
(g) Power Requirement (quiescent) _____ +60 v. O 22 ma., −60 v. O 22 ma.
(h) Physical size _____ 6.9 x 4.5 x .75 inches.

An amplifier having these characteristics is the Systron-Denner Model 3814.

*Torque-loop amplifier.*—The torque-loop amplifier 110 is a low-signal amplifier which amplifies the voltage signal outputs of the torque sensor or pressure sensors (40 millivolts maximum) to a maximum of 10 volts. A unit which can be used is the Incor Model GS 3 manufactured by Instrumentation Amplifiers and Supplies, Inc.

*Power supply description.*—A DC power supply provides all of the required DV voltages to the amplifiers and sensors at their desired current levels, regulation and ripple levels.

(a) Amplifier excitation _____ ±60 volts at less than 1% regulation.
(b) Potentiometer excitation ___ ±50 volts at less than 5% regulation.
(c) DC Lights and Switches ____ ±28 volts at less than 5% regulation.
(d) Torque sensor _____ ±12 volts at less than 1% regulation.
(e) Pressure sensors (A and B) channels—torque loop _____ ±12 volts at less than 1% regulation.

A power supply unit which can be used is the model 82–200–1 manufactured by Voltex, Inc., Long Island City, N.Y.

The operation of the system will now be described.

*Normal operation.*—The system can be made operational by selecting the manual modes utilizing the rotary "MODE SELECTOR" switch on the control panel in the sequence described in the following sections.

*Standby.*—The "MODE SELECTOR" switch is moved from the "OFF" position to "STANDBY" and the "STANDBY" light comes on. All indicator lights should show "NORM" except for control pressure which shows "LOW" and safety solenoid which shows "OFF". The power supplies are energized in this mode.

*Operate.*—To start the pumps and motors, the "MODE SELECTOR" switch is moved from the "STANDBY" to the "OPERATE" position, the "STANDBY" light goes off and the "AC" light goes on. The electric motor begins its startup at reduced voltage. As the electric motor builds up in speed, the control pressure light 82 A and B switches from "LOW" to "NORM" and the oil and motor temperature lights 78 A and B and 80 A and B remain lit in the "NORM" condition. After 30 seconds the "OPERATE" light 134 comes on and full voltage is applied to the electric motor within 30 to 40 seconds after initiation of the "OPERATE" mode. The operate light 134 remains illuminated during all other modes of operation. The safety solenoid light 84 A and B remains "OFF" during startup of the system. The system is allowed to warm up for approximately 10–15 minutes or more if ambient temperature is below freezing, for oil temperature to stabilize. The bias voltage on pump swash plates should be checked to make sure it is sufficient to hold swash plates in their neutral position.

*Fish handling.*—To position the fish from its stowed position to its operational depth, the "TENSION" and "VELOCITY" modes are employed.

*Tension mode.*—The "MODE SELECTOR" switch 136 is placed in "TENSION" position and its respective indicator light comes on if the basket is firmly placed under the fish. In this mode a reference torque of approximately 1,000 pounds of cable force is applied to the drum to keep the cable taut while lowering or raising the boom. This is accomplished through application of a dummy signal to the output side of amplifier 114 (AR–7). The boom and fish are moved from the fully retracted position to the full down position placing the fish and basket at the water surface. No sensors are operative in this mode.

*Velocity mode.*—The "MODE SELECTOR" switch 136 is placed in "VELOCITY" position and its respective light comes on and the tension light goes off. The fish is then raised out of the basket using the "RAISE/LOWER CONTROL" knob and the basket retracted from under the fish. With the basket out of the way, the fish is then lowered to its desired operational depth by holding the "RAISE/LOWER CONTROL" knob in the "DOWN" position. The boom is then raised to its up position prior to switching into either of the position control modes. During the lowering operation, the desired depth meter reading is checked to see that it is approximately equal to the actual depth meter reading.

Note that the fish depth must be greater than 40 feet prior to transferring to either of the position control modes and the boom must be in the "UP" position as well.

During the raising of the boom to its "UP" position, the "VELOCITY" light will go off and the safety solenoid "OFF" light will illuminate. After the boom is "UP" and the depth of the fish is greater than 40 feet, one minute must elapse before either the DEPTH or CABLE modes are capable of being made operative. No sensors are operative in this mode.

*Position control.*—After the fish has been lowered to some depth below the minimum depth setting of 40 feet, the "MODE SELECTOR" switch 136 can be moved to one of the position control modes (either "DEPTH" or "CABLE" control). Prior to switching to the position control modes, the operator must estimate the angle between the tow cable and the horizon (horizontal plane). This estimated angle is set on the ACCELEROMETER potentiometer dial. Normally this angle will vary in value from 90 degrees (vertical tow cable) to approximately 40 degrees. Both the compensation gain and the feedforward gain controls are set at their mid-position settings.

*Depth control.*—When the "MODE SELECTOR" switch is placed in "DEPTH" position, its respective light comes on and the velocity light goes off. In this mode signals from the depth sensor located in the fish are fed into the system. Change of depth in this mode is accomplished by using the "RAISE/LOWER CONTROL" knob. The fish should not be lowered to a depth greater than that which would attempt to leave less than 40 feet of cable on the drum (total cable length is 500 feet); if it should be lowered to a greater depth, the "40 foot DRUM LIMIT" light 80 will illuminate and the fish will be given an override signal to rise above this maximum depth limit.

The accelerometer may be switched in to provide a reeling signal 90 degrees in advance of the ship vertical velocity to the input of amplifier 114 (AR–7). Long term correction is accomplished by adding the output of the depth gauge to the output set on the desired-depth gauge. An error signal proportional to the difference between desired and actual depth is produced. Simultaneously, a signal in phase with the vertical ship velocity is provided by either the torque or the pressure sensor alternatively.

*Cable control.*—The "MODE SELECTOR" switch is placed in "CABLE" position and its respective light comes on and the depth light goes off. In this mode signals from the cable length potentiometer located in the cable out sensor are fed into the system. For any speed other than zero (vertical cable), there will be a difference between the cable length and the desired depth/length meter readings. For any difference in length, the cable will be reeled in until no differential exists. Change of depth is accomplished in the same manner as in the depth mode (see "DEPTH CONTROL" section). This mode is identical to the depth control mode except that the long term correction is generated by comparing actual cable length to desired cable length.

*Sub modes.*—Several sub modes of position control are available to the operator for controlling the cable force. Normally the "IN-OUT" selector switch for the "ACCELEROMETER" is set at the "IN" position. The force feedback selector switch may be set at either "PRESSURE" or "TORQUE" dependent on the operator's choice.

*Raising the fish.*—The sequence of operation is reverse for returning the fish to its stowed position on board the ship. The fish may be raised in the VELOCITY mode or in either of the POSITION control modes by placing the "RAISE/LOWER CONTROL" knob in its "UP" position and raising the fish to the minimum depth setting of 40 feet. At this point the boom is lowered to the down position, placing the basket at the water surface. To raise the fish above the minimum depth, the mode selector switch is placed in the "VELOCITY" mode and its respective indicator light comes on. The fish is then raised to the surface of the water by placing the "RAISE/LOWER CONTROL" konb in the "UP" position.

Note that the rate of rise is proportional to the position of the "RAISE/LOWER CONTROL" knob between neutral and the maximum "UP" position.

With the fish at the surface of the water, the basket is swung into position under the fish and the fish lowered into the basket. At this point the "MODE SELECTOR" switch is placed in the "TENSION" mode and the boom (with the fish in basket) is raised to its normal stowed position. The "MODE SELECTOR" switch is then placed in "OFF" position, shutting down the control system.

*Fixed depth tow.*—If, due to calm sea states or for any other reasons, it is desired to tow the fish at a fixed depth, the following operating procedure is followed:

*Start and fish positioning.*—Start-up and fish positioning is the same as previously described in the Normal Operation. Fish Handling section. Once the fish has been lowered to the desired operating depth, the control panel "MODE SELECTOR" switch can be turned to the "OFF" position. At this time the drum pawl lock must be engaged to hold the cable in this fixed depth position.

*Restarting.*—To restart, the same procedure as was used when initially starting is followed noting that the "TENSION" mode is not operative (fish is not in the basket). The operator selects the "VELOCITY" mode and raise the fish slightly to relieve the load on the pawl lock. The pawl lock is then released and the fish relocated to its desired operating depth using the "RAISE/LOWER CONTROL" knob to direct the positioning of the fish. The operator must hold the "VELOCITY" mode for a period of at least 1 minute prior to switching to either of the position control modes.

*Operating procedure—emergency.*—No special subsystem is provided in the control system for operation during an emergency condition, however some backup features are provided for partial system failures by use of various modes of operation.

*Main power failure.*—If the system should fail to operate due to loss of either the electric motor power or to loss of the hydraulic power supply, the drum is locked in position using the pawl lock. The original AN/SQA-10 differential drum drive chains and transfer drive chains are reconnected to the drum after removal of the control system's drive chains. The hoist system can then be operated in a "REEL-IN" mode after unlocking the pawl lock.

*Subsystem failure.*—In the case where any of the automatic safety interlock features cause the safety solenoid valves to close, hydraulically locking the system, the control system must be turned "OFF" after noting which failure indication lights, if any, were lit. The drum pawl lock is then inserted. If the nature of the failure is repairable, then after repairs is completed, the control system is made operative and placed in the "VELOCITY" mode. At this point the drum pawl lock is removed. The fish is then raised and stowed for further evaluation of the failure.

*Sensor failure.*—Should the system lose operation of any of the position control sensors, such as the torque, pressure, depth or acceleration sensors, the operator takes the system out of the position control mode and switches to the "VELOCITY" control mode. The fish is then raised, using the "RAISE/LOWER CONTROL." If either of the TORQUE FEEDBACK SENSORS is usable, then the fish can be lifted to its stowed position in the "TENSION" mode. If both torque and pressure feedback are not operative, then the fish is stowed in the basket in the boom down position at the surface of the water until the "TENSION" mode becomes operative.

*40-foot limit switch failure.*—If for any reason the cable becomes reeled out beyond the 40-feet drum limit, a second limit at 25 feet remaining on the drum causes the safety solenoids to deenergize, locking the hydraulic system and applying the spring loaded pneumatic brakes. The 25-foot limit switch must then be by-passed by a jumper in order to activate the safety solenoid valves and release the brakes. The fish is then raised and stowed, and the system failure investigated and repaired.

*Emergency shutdown.*—In the event of any emergency condition, the operator may shut the system down by simply turning the "MODE SELECTOR" switch to the off position. The safety solenoids deactivate and the mechanical brakes are applied. In addition, all electrical power is shut off. At this point the drum pawl lock is inserted and the emergency condition investigated.

In the event of an emergency condition occurring below deck, the circuit breaker located on the front panel of the chassis assembly in the electronic package assembly, should be pulled out. This removes all electrical power from the system, locks the hydraulic system and sets the brakes. The drum pawl lock is then inserted and the emergency is investigated.

*Preliminary and periodic checks.*—Several components should be checked prior to initial start up of the system and at periodic intervals. These items are above and beyond normal maintenance procedure and should be accomplished at approximately one month intervals.

*Brake adjustment.*—The mechanical brakes should be adjusted in accordance with the manufacturers instructions. The adjustment of the air flow control valve is determined during actual shipboard operation and should be noted.

*Relief valves.*—The main pump relief valves are set at 3200 p.s.i. The control pressure relief valves are set at 1000 p.s.i. The replenish system relief valves are set at 120 p.s.i. The main system relief valves are set at 3000 p.s.i.

*Dampers.*—The dampers on the pendulum assembly are in both the pitch and roll axis. Initially they should be set at midpoint. Final setting is determined during actual shipboard operation and should be recorded. Periodic checks are made to determine that this setting has not been disturbed.

*Accumulators.*—The hydraulic system contains three accumulators. These are precharged with the system not operating and are checked periodically. The settings are as follows:

Replenishment accumulator 87____. 60 p.s.i.g.
Servo control accumulator 99 ____. 500 p.s.i.g.
Leakage accumulator 109 _____. Set at ½ the expected nominal operating pressure.

The initial setting of the leakage accumulator should be 100 p.s.i.g. for a laboratory set up where there is no cable load. The initial setting of the leakage accumulator should be approximately 700 p.s.i.g. Final setting is determined after operation. After setting the accumulators, the system is bled completely and the settings rechecked.

It will be understood that various changes in the details, materials, and arrangements of parts (and steps), which have been herein described and illustrated in order to explain the nature of the invention, may be made by those skilled in the art within the principle and scope of the invention.

We claim:

1. Depth control apparatus for a submerged object which is to be towed by a towing vessel at a fixed selectable depth in marine environment comprising, in combination:

a motor system for reeling in and reeling out said towed object including a towing cable, a cable drum and motor means for rotating said drum;

sensor means for providing signals representative of the state of various operational parameters of said motor system and of the depth of said towed object; and electronic means for processing said sensor signals and producing electrical control signals in response thereto, said control signals being used to automatically control the reeling operations of said motor system.

2. Depth control apparatus as set forth in claim 1, wherein said sensor means include a depth sensor, an accelerometer, a cable-length sensor, a cable-drum torque sensor and hydraulic-differential-pressure transducers and wherein said motor system is an electrohydraulic system.

3. Depth control apparatus as set forth in claim 2, wherein said depth and cable-length sensors are alternatively selectable for use and said torque sensor and hydraulic-differential-pressure transducers are likewise alternatively selectable for use.

4. Depth control apparatus as set forth in claim 2, wherein said accelerometer may selectively be switched into or out of use.

5. Depth control apparatus as set forth in claim 2, wherein said electronic means includes circuits for depth control and cable force control, said depth sensor, accelerometer and cable-length sensor feeding said depth control circuits, said cable-drum torque sensor and hydraulic-differential-pressure transducers feeding said cable-force control circuits, said depth and cable-length sensors being alternatively selectable for use, said cable-drum torque censor and hydraulic-differential-pressure transducers being likewise alternatively selectable for use and being useable simultaneously with whichever of said depth or cable-length sensors is selected, and said accelerometer being selectively switchable into or out of use.

6. Depth control apparatus as set forth in claim 5, wherein said motor means for rotating said drum includes hydraulic motors with movable swash-plate means for controlling their hydraulic output and means for moving said swash-plates, the output of said electronic circuits being fed to said means for moving said swash-plates thereby automatically controlling the output of said hydraulic motors to maintain said towed object at its selected fixed depth.

7. Depth control apparatus for a submerged object which is to be towed by a towing vessel at a fixed selectable depth in marine environment comprising, in combination:

a motor system for reeling in and reeling out said towed object including a towing cable, a cable drum and motor means for rotating said drum;

sensor means for providing signals representative of the state of various operational parameters of said motor system, the vertical acceleration of the towing vessel and the depth of said towed object; and electronic means for processing said sensor signals and producing electrical control signals in response thereto, said control signals being used to automatically control the reeling operations of said motor system.

8. Depth control apparatus as set forth in claim 7, wherein said sensor means include a depth sensor, an accelerometer, a cable-length sensor, a cable-drum torque sensor and hydraulic-differential-pressure transducers and wherein said motor system is an electrohydraulic system.

9. Depth control apparatus as set forth in claim 8, wherein said depth and cable-length sensors are alternatively selectable for use and said torque sensor and hydraulic-differential-pressure transducers are likewise alternatively selectable for use.

10. Depth control apparatus as set forth in claim 8, wherein said accelerometer may selectively be switched into or out of use.

11. Depth control apparatus as set forth in claim 8, wherein said electronic means includes circuits for depth control and cable force control,
   said depth sensor, accelerometer and cable-length sensor feeding said depth control circuits,
   said cable-drum torque sensor and hydraulic-differential-pressure transducers feeding said cable-force control circuits,
   said depth and cable-length sensors being alternatively selectable for use,
   said cable-drum torque sensor and hydraulic-differential-pressure transducers being likewise alternatively selectable for use and being useable simultaneously with whichever of said depth or cable-length sensors is selected, and
   said accelerometer being selectively switchable into or out of use.

12. Depth control apparatus as set forth in claim 11, wherein said motor means for rotating said drum includes hydraulic motors with movable swash-plate means for controlling their hydraulic output and means for moving said swash-plates, the output of said electronic circuits being fed to said means for moving said swash-plates thereby automatically controlling the output of said hydraulic motors to maintain said towed object at its selected fixed depth.

References Cited

UNITED STATES PATENTS

| | | | |
|---|---|---|---|
| 2,414,473 | 1/1947 | Mahnke | 254—172 |
| 3,088,710 | 5/1963 | Evans | 254—172 |
| 3,276,748 | 10/1966 | Nickerson | 254—173 |
| 3,282,568 | 11/1966 | Shuster | 254—173 |
| 2,876,963 | 3/1959 | Se Legue | 254—173 |
| 3,088,710 | 5/1963 | Evans | 254—173 |
| 3,259,371 | 7/1966 | Goepfert | 254—173 |

FOREIGN PATENTS

| | | |
|---|---|---|
| 1,202,453 | 10/1965 | Germany. |
| 815,544 | 6/1959 | Great Britain. |

HARVEY C. HORNSBY, Primary Examiner

U.S. Cl. X.R.

60—53; 114—235; 254—186